United States Patent
Taylor

(10) Patent No.: US 6,315,299 B1
(45) Date of Patent: Nov. 13, 2001

(54) APPARATUS AND METHOD OF FORMING A TENSION RESISTANT O-RING

(76) Inventor: Julian S. Taylor, 8300 SW. 8th St., OKC, OK (US) 73128

( * ) Notice: Subject to any disclaimer, the term of this patent is extended or adjusted under 35 U.S.C. 154(b) by 0 days.

(21) Appl. No.: 09/444,259

(22) Filed: Nov. 22, 1999

(51) Int. Cl.[7] .................................................. F16J 9/00
(52) U.S. Cl. ...................... 277/458; 277/651; 277/924; 277/910; 156/304.3; 249/57; 264/DIG. 67; 264/146; 264/152
(58) Field of Search ..................................... 277/458, 584, 277/611, 626, 627, 630, 644, 645, 650–2, 910, 924; 264/634, 678, 113, 146, 152, DIG. 67; 249/57, 59; 156/259, 294, 304.3

(56) References Cited

U.S. PATENT DOCUMENTS

| | | | |
|---|---|---|---|
| 2,717,024 | * | 9/1955 | Jelinek ................................. 264/126 |
| 2,828,238 | * | 3/1958 | Baston et al. ........................ 156/70 |
| 2,893,058 | * | 7/1959 | Wurtz et al. ......................... 425/35 |
| 3,313,553 | * | 4/1967 | Gastineau ........................... 277/605 |
| 3,406,979 | * | 10/1968 | Weber ................................. 277/629 |
| 3,542,375 | * | 11/1970 | Renwick ............................. 277/646 |
| 3,549,156 | * | 12/1970 | Van Vleet et al. ................... 277/652 |
| 3,660,192 | * | 5/1972 | Smith et al. ........................ 156/155 |
| 3,813,105 | * | 5/1974 | McQueen ............................ 277/554 |
| 4,053,085 | * | 10/1977 | Brown et al. ........................ 220/378 |
| 4,178,003 | * | 12/1979 | Hobson .............................. 277/644 |
| 4,431,197 | * | 2/1984 | Kirkwood ........................... 277/610 |
| 4,643,863 | * | 2/1987 | Martini .............................. 264/219 |
| 4,755,244 | * | 7/1988 | Allison .............................. 156/158 |
| 5,082,297 | * | 1/1992 | Flasher . |
| 5,160,122 | * | 11/1992 | Balsells ............................. 267/167 |
| 5,194,153 | * | 3/1993 | Bardsley ............................ 210/392 |
| 5,653,450 | * | 8/1997 | De Villepoix et al. ............... 277/649 |
| 5,743,535 | * | 4/1998 | Hodgins . |

* cited by examiner

Primary Examiner—Anthony Knight
Assistant Examiner—Alison K. Pickard
(74) Attorney, Agent, or Firm—Robert K. Rhea

(57) ABSTRACT

A method of forming a tension resistant O-ring is formed by extruding a length of precured elastomer with a coextensive central aperture; longitudinally dividing the elastomer; winding a strand of nonelastic synthetic material to form an endless ring having a predetermined toric axis diameter and a toric diameter less than the diameter of the elastomer aperture; assembling the endless ring and elastomer halves in a rubber mold; and, heating the mold to cure the elastomer.

5 Claims, 2 Drawing Sheets

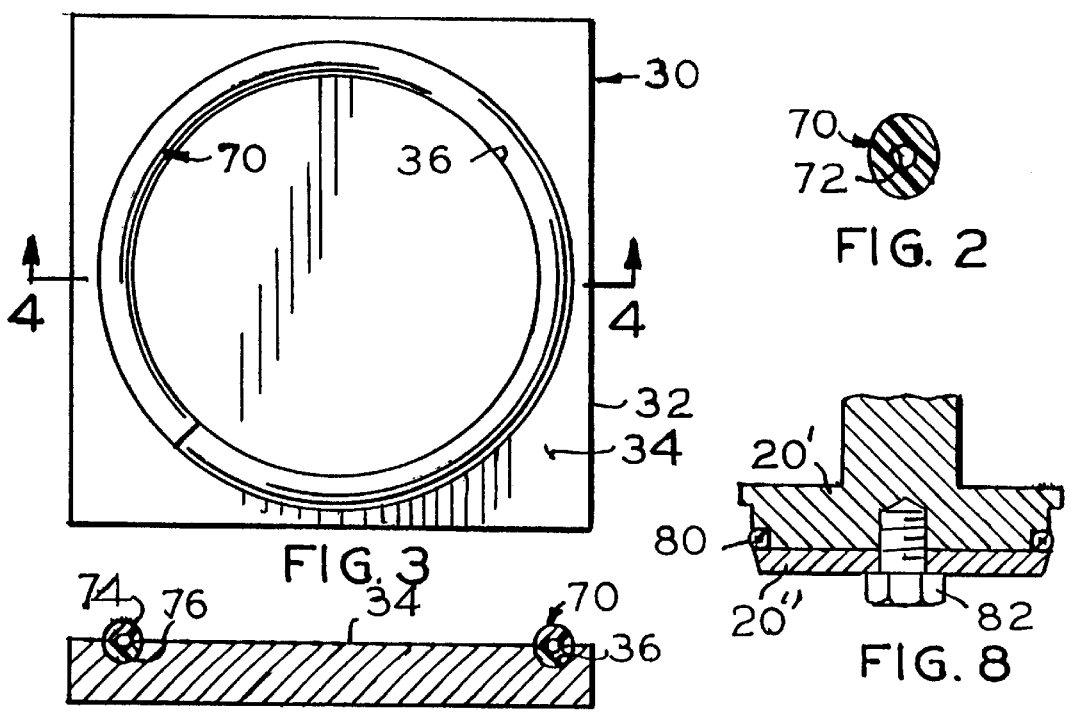
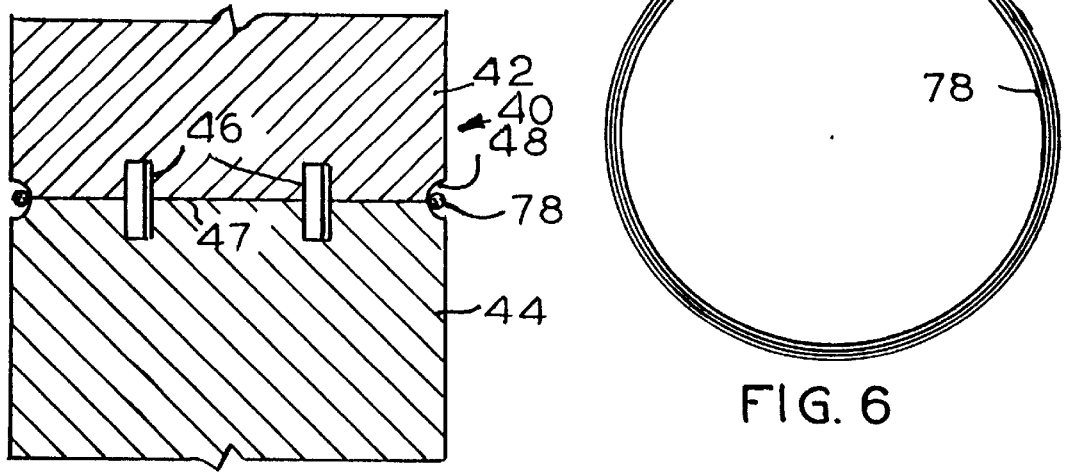
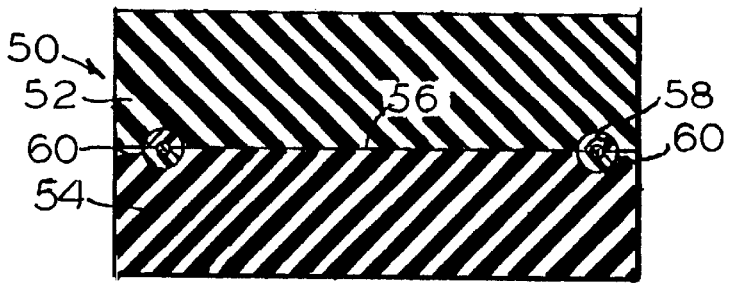

APPARATUS AND METHOD OF FORMING A TENSION RESISTANT O-RING

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to O-ring seals and more particularly to an apparatus and method of forming a tension resistant O-ring.

1. Field of Invention

O-ring seals are well known and are generally formed from elastomeric material of a predetermined diameter. These seals are used for preventing fluid leaking in many applications and in particular in valves in the oil industry. These seals are effective in maintaining the instrument fluid tight under pressures for example, to 2000 psi, however when the pressure against the seal exceeds these pressures and is in the range of, for example, 68,950 KPA (10,000 psi) and a relief valve opens due to such pressure this high pressure dislodges the O-ring seal from its groove. Another O-ring must be installed in its place which requires disassembly of the relief valve in order to return the apparatus to operating condition.

This invention obviates this problem by forming an O-ring seal which is tension resistant and remains in place.

2. Description of the Prior Art

Conventional O-ring seals presently available in the marketplace may usually be expanded diametrically, beyond their diameter of repose, through a certain limit without exceeding the yield point of the O-ring material.

I am not aware of any prior patent that provides an O-ring seal in which its manufactured diameter cannot be exceeded by either manually or mechanically applied force.

BRIEF SUMMARY OF THE INVENTION

A continuous length of procured elastomer is extruded in elliptical configuration having a central aperture. A selected length of this tube is longitudinally and divided on its minor axis to form first and second halves. The first half is placed in a circular groove of predetermined diameter in a rubber mold with ends abutted and the semicircular opening facing upwardly. A high tensile cord of nonelastic syntectic material is wound in a groove on a cylinder equal in diameter with the toric axis of an O-ring to be formed and heat sealed to form a single endless strand. This strand is placed in the upwardly open semicircular elastomer groove. The second elastomer half is cooperatively superposed on the first elastometer half with the butted ends of the second half mismatched with the abutted ends of the first half. A companion section of the rubber mold overlies the elastomer and strand assembly and is heated to cure the elastomer, resulting in a tension resistant endless O-ring.

The principal object of this invention is to provide an apparatus and method for forming tension resistant O-rings for controlling fluid under high pressure without material damage to the O-ring sealing such pressure. Another purpose is to prevent the O-ring from being blown out of its groove when an O-ring sealed piston leaves its seat.

BRIEF DESCRIPTION OF THE SEVERAL VIEWS OF THE DRAWINGS

FIG. 2 is a transverse cross-section of extruded elastomer;

FIG. 3 is a top view of a length of the material of FIG. 2 in place in an upwardly open grove;

FIG. 4 is a vertical cross-section taken substantially along the lie 4—4 of Fig.3;

FIG. 5 is a fragmentary longitudinal cross-section of a cylindrical form;

FIG. 6 is a top view of an endless ring formed by nonelastic material;

FIG. 7 is a vertical cross-section view of a rubber mold containing the tension resistant O-ring assembly; and, FIG. 8 is a fragmentary cross-section view, to a smaller scale, illustrating installation of a tension resistant O-ring on the perimeter of a valve piston.

DETAILED DESCRIPTION OF THE INVENTION

Figure 1:
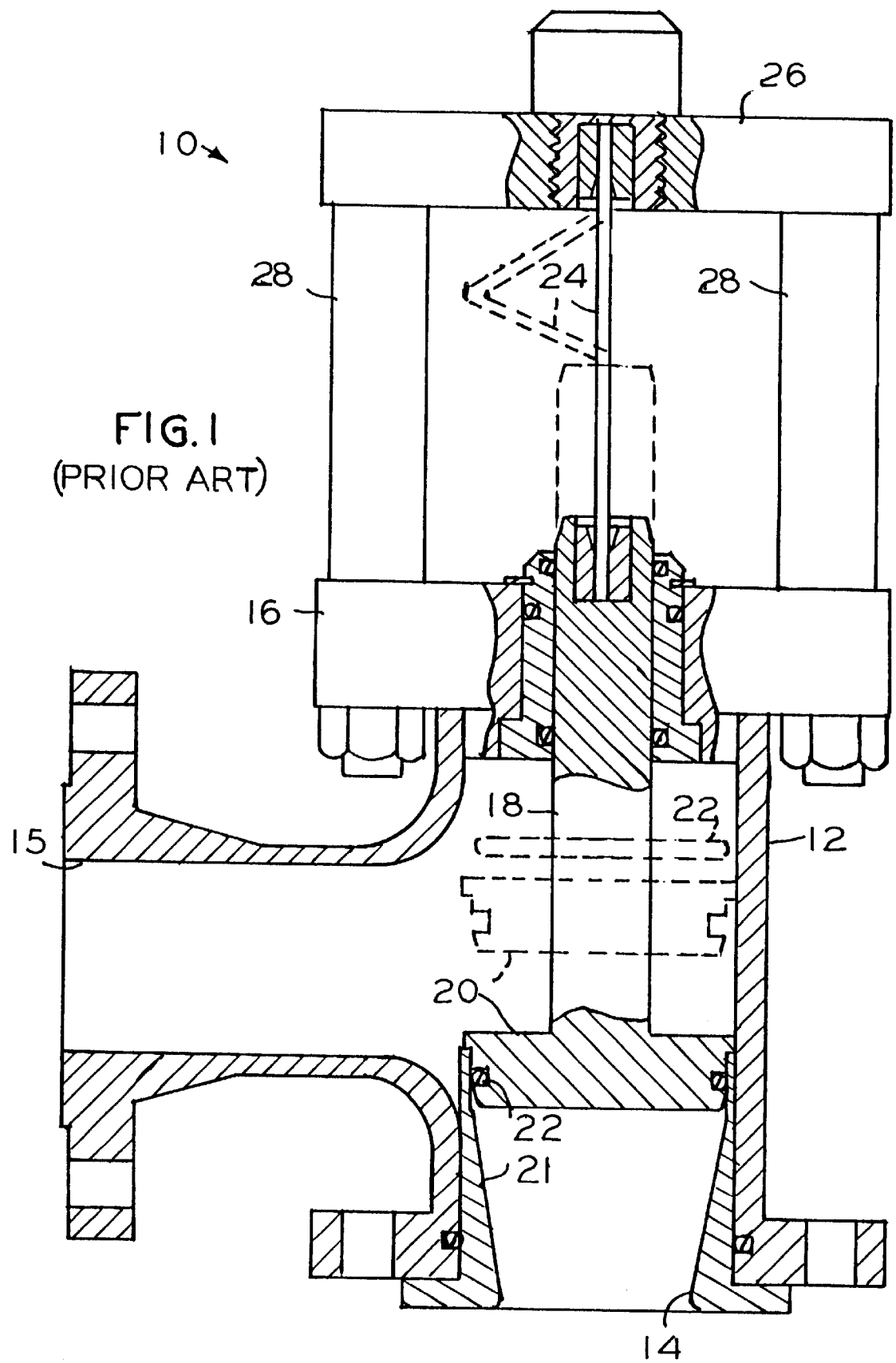
FIG. 1 is a vertical cross-sectional view of a typical buckling pin type pressure relief valve, illustrating the valve in open position by dotted lines.

Like characters of reference designate like parts in those figures of the drawings in which they occur.

In the drawings:

The reference numeral 10 indicates a right angle relief valve body 12 having an inlet port 14 and an outlet 15. The end of the valve body opposite inlet port is closed by a centrally bored bonnet 16 which slidably receives a rod 18 of a valve piston 20 normally sealing with the wall 21 forming the inlet port. An O-ring, 22 insures a fluid tight fit. The piston 20 is held on seat by a slender column 24, axially interposed between the end of the rod 18 opposite the piston and a plate 26, supported in spaced relation with respect to the bonnet 16 by a plurality of posts 28. Excess pressure beyond a preset value for the slender column 24 against the piston 20, results in the slender column 24 collapsing or bending, in accordance with Euler's law for slender columns, which suddenly releases the fluid pressure at the inlet port to the atmospheric pressure of the outlet port 15. This sudden pressure differential between the inlet and outlet ports, particularly when such pressure is on the order of 68,950 KPA (10,000 psi), results in the O-ring 20 leaving its groove. This necessitates shutting down the system and removing the valve body 12, from the line being monitored, in order to replace the O-ring 22 and reseat the piston 20 after the problem, if any, has been corrected. If this O-ring 22 can be caused to remain in place all that is necessary for placing the valve 10 back in operation is manually closing the piston with its sealing wall 21 and installing a new slender column.

The above description forms no part of the present invention other than to set forth a typical buckling pin relief valve problem illustrating the desirability of a new improved tension resistant O-ring as disclosed hereinbelow.

Referring to FIGS. 2–7, the reference numeral 30 indicates a grooved block for preparing the material for a tension resistant O-ring. The block 30 comprises a rectangular section of material 32 having a planer top surface provided with an annular upwardly open groove formed on a diameter equal with the toric axis of the O-ring to be formed. The radius of the upwardly open semicircular groove is equal with the radius of the O-ring to be formed.

A second form, indicated by the numeral 40 (FIG. 5.) is for preparing the tension strand for an O-ring to be formed.

The form 40 comprises two cylindrical parts 42 and 44 each having a right circular end surface in contiguous contact when the two parts are arranged in axial aligned relation. The axial relation is maintained by guide pins 46 cooperatively projecting into respective bore holes in the interface 47 formed by the end surfaces. The assembled form is provided with a circumferential semicircular groove 48 centrally intersecting the interface 46 at the perimeter of the two members 42 and 44. The semicircular groove is formed on a radius, substantially equal with the radius of the O-ring to be formed and on a diameter substantially equal to the toric axis of the O-ring to be formed.

A third unit indicated by the reference numeral 50 (FIG. 5), comprises a rubber mold having two parts 52 and 54 each substantially rectangular in overall configuration having a common edge surface which when abutted in contiguous contact relation forms an interface 56. This interface is intersected by an angular, circular in transverse cross-section, opening 58, formed on a diameter equal with the toric axis of an O-ring to be formed. At least one of the blocks 52 or 54 is provided with weep holes 60 communicating with the opening 58 at one end and exposed to the atmosphere at the opposite end for draining or releasing excess material during the curing of an O-ring as presently explained.

In carrying out the invention a continuous length of recurred elastomer 70 is extruded in elliptical transverse cross-section with a central coextensive opening 72 having a diameter substantially one-third the minor diameter of the elastomer. The diameter of the extrusion 70 along its minor axis is 0.9525 cm (3/8 inch), by way of example. The major axis of the ovate extrusion 70 is preferably substantially one-third greater than its minor axis. A length of the extrusion 70 is placed within the groove 36 of the form 30 with the respective ends of the elastometer in abutted relation. In this position the minor axis of the extrusion 70 is aligned with the top surface 34 of the block 30. The extrusion 70 is then divided along its minor axis, while in the groove 36 as a guide by using a sharp instrument, resulting in two elongated semiovate sections of the elastomer, as indicated in 74 and 76. A thread of a nonelastic synthetic material presently marketed by DuPont Corp. under the trademark Kevlar, or another suitable yarn, is wound around the form 40 within its circumferental groove 48 to form a strand of the material having a diameter approximately 3/4 the diameter of the elastomer opening 72. This wound strand of wraps is bonded together, as by heating or cementing in the form 40, forming an endless ring of the material, as indicated at 78. The semiovate half 76 of the elastomer is placed in the semicircular groove of rubber mold 50 with the divided opening 72 disposed upwardly. The ring of the synthetic material 78 is then placed within the half of the opening in the elastomer half 76. The other or opposite half of the elastomer of 74 is placed in registration with the half 76 and the top section of the rubber mold 50 is then position as illustrated by FIG. 7. The mold is heated with the assembled elastomer parts and ring 78 to a desired temperature, for example, 148.9° C. (300° F.) to 315.5° C. (600° F.) depending upon the elastomer for curing the elastometer and forming a tension resistant O-ring 80 to be used in place of the O-ring 22 in the valve disclosed by FIG. 1.

Referring also to FIG. 8, since the tension O-ring 80 may not be expanded beyond the diameter of its toric axis to install the O-ring on the piston valve 20' it is necessary to modify the piston valve as indicated at 20". The piston valve is transversely divided at the position of the groove, normally nesting the O-ring 22 allowing the O-ring 20 to be seated in the rabbited edge defining the O-ring receiving groove in the perimeter of the remainder of the piston valve 20' as by a bolt or screw 82.

Obviously the invention is susceptible to changes or alterations without defeating its practicability. Therefore, I do not wish to be confined to the preferred embodiment(s) shown in the drawing(s) and described herein.

I claim:

1. A method of producing a tension resistant O-ring comprising the steps of:
   a) extruding a predetermined length of ovate shaped elastomer having a coextensive central aperture;
   b) dividing the length of elastomer along the minor axis of the ovate shape to form first and second identical halves, each said half having a coextensive semicircular trough;
   c) providing an endless ring of flexible non-elastic synthetic material having a predetermined toric axis diameter and a toric diameter less than the diameter of the central aperture;
      1) providing a cylindrical form having a circumferential groove of predetermined diameter;
      2) winding a thread-like strand of said synthetic material in the groove of said cylindrical form to generate said endless ring;
   d) providing a two-part mold having a cooperating endless semicircular groove of predetermined diameter in confronting face surfaces;
   e) placing said first elastomer half in the endless groove of one part of the two-part mold with the semicircular trough disposed upwardly;
   f) placing the endless ring in the upwardly open semicircular trough of the first elastomer half;
   g) placing the second elastomer half in registration on the first elastomer half;
   h) closing the two-part mold for compressing the assembled elastomer halves and endless ring;
   i) heating the two-part mold to a predetermined temperature curing the elastomer; and,
   j) removing the finished O-ring from the two-part mold.

2. The method according to claim 1 in which the major diameter of the ovate shaped elastomer in step a) is substantially one-third greater than the diameter of the minor axis and the diameter of the aperture is substantially equal with one-third the diameter of the minor axis.

3. A method of producing a tension resistant O-ring comprising the steps of:
   m) extruding a predetermined length of ovate shaped elastomer having a coextensive central aperture;
   n) dividing the length of elastomer along the minor axis of the ovate shape to form first and second identical halves, each said half having a coextensive semicircular trough;
   o) providing an endless ring of flexible non-elastic synthetic material having a predetermined toric axis diameter and a toric diameter less than the diameter of the central aperture;
      1) providing a cylindrical form having a circumferential groove of predetermined diameter;

2) winding a thread-like strand of said synthetic material in the groove of said cylindrical form to generate said endless ring;

p) cooperatively assembling said first and second halves in superposed relation with said endless ring interposed therebetween; and, q) heating the assembly of step p) to a predetermined temperature.

4. The method according to claim 3 in which the major diameter of the ovate shaped elastomer in step m) is substantially one-third greater than the diameter of the minor axis and the diameter of the aperture is substantially equal with one-third the diameter of the minor axis.

5. A method of producing a tension resistant O-ring comprising the steps of:

t) extruding a predetermined length of elastomer in a desired transverse cross section configuration with a coextensive central aperture;

u) dividing the length of elastomer along the diameter to form first and second identical halves, each said half having a coextensive semicircular trough;

v) providing an endless ring of flexible non-elastic synthetic material having a predetermined toric axis diameter and a toric diameter less than the diameter of the central aperture;

1) providing a cylindrical form having a circumferential groove of predetermined diameter;

2) winding a thread-like strand of said synthetic material in the groove of said cylindrical form to generate said endless ring;

w) cooperatively assembling said first and second halves in superposed relation with said endless ring interposed therebetween; and, x) heating the assembly of step w) to a predetermined temperature.

* * * * *